US 8,694,856 B2

(12) United States Patent
Tuyls et al.

(10) Patent No.: US 8,694,856 B2
(45) Date of Patent: Apr. 8, 2014

(54) PHYSICALLY UNCLONABLE FUNCTION WITH TAMPER PREVENTION AND ANTI-AGING SYSTEM

(75) Inventors: Pim Theo Tuyls, Turnhout (BE); Geert Jan Schrijen, Venlo (NL)

(73) Assignee: Intrinsic ID B.V., Eindhoven (NL)

( * ) Notice: Subject to any disclaimer, the term of this patent is extended or adjusted under 35 U.S.C. 154(b) by 221 days.

(21) Appl. No.: 13/390,255

(22) PCT Filed: Aug. 6, 2010

(86) PCT No.: PCT/EP2010/061460
§ 371 (c)(1),
(2), (4) Date: Feb. 13, 2012

(87) PCT Pub. No.: WO2011/018414
PCT Pub. Date: Feb. 17, 2011

(65) Prior Publication Data
US 2012/0179952 A1   Jul. 12, 2012

(30) Foreign Application Priority Data
Aug. 14, 2009   (EP) ..................................... 09167906

(51) Int. Cl.
*G11C 29/00*   (2006.01)
(52) U.S. Cl.
USPC ........................................................ 714/763
(58) Field of Classification Search
USPC .................... 714/763, 738–739; 365/211–212
See application file for complete search history.

(56) References Cited
U.S. PATENT DOCUMENTS
6,330,668 B1   12/2001   Curiger et al.

2005/0055524 A1   3/2005   Gulick et al.
2009/0024913 A1   1/2009   Vedula

FOREIGN PATENT DOCUMENTS
WO   WO 2006/053304   5/2006
WO   WO 2006/129242   12/2006
WO   WO 2009/024913   2/2009

OTHER PUBLICATIONS

Guneysu et al., Transforming write collision in block RAM's into security applications, 2009, IEEE, p. 128-134.*
Suh et al., Aegis: a single-chip secure processor, 2007, IEEE Design, & Test of computers, p. 570-580.*
Guajardo et al., Physical unclonable functions and public-key crypto for FPGA IP protection, 2007, IEEE, p. 189-195.*
International Search Report for PCT/EP2010/061460, mailed Aug. 6, 2010.
Written Opinion of the International Searching Authority for PCT/EP2010/061460, mailed Aug. 6, 2010.
Halderman, A.J. et al., "Lest We Remember: Cold Boot Attacks on Encryption Keys", Proceedings of the Usenix Security Symposium, vol. 17thy symp., (Jan. 1, 2008), pp. 45-60.

(Continued)

*Primary Examiner* — Shelly A Chase
(74) *Attorney, Agent, or Firm* — Nixon & Vanderhye P.C.

(57) ABSTRACT

Systems for generating an identifying response pattern comprising a memory (120) used as a physically unclonable function configured for generating a response pattern dependent on physical, at least partially random characteristics of said memory may be vulnerable to freezing attacks and to aging. A memory-overwriting device (110) configured for overwriting at least a first portion of the plurality of memory locations to obscure the response pattern in the memory avoids freezing attacks. An anti-degradation device (160) configured to write to each respective location of a second portion of the plurality of memory locations an inverse of a response previously read from the memory reduces the effects of aging.

16 Claims, 4 Drawing Sheets

(56) References Cited

OTHER PUBLICATIONS

Holcomb, D. E. et al., "Power-up SRAM State as an Indentifying Fingerprint and Source of True Random Numbers", IEEE Transactions on Computers, IEEE Service Center, vol. 57, No. 11, (Nov. 1, 2008), pp. 1-14.

Kumar, S.V. et al., "Impact of NBTI on SRAM Read Stability and Design for Reliability", Proceedings of the 2006 $7^{th}$ International Symposium on Quality Electronic Design—Mar. 2-29, 2006, (Jan. 1, 2006), p. 6PP.

* cited by examiner

PHYSICALLY UNCLONABLE FUNCTION WITH TAMPER PREVENTION AND ANTI-AGING SYSTEM

This application is the U.S. national phase of International Application No. PCT/EP2010/061460, filed 6 Aug. 2010, which designated the U.S. and claims priority to EP 09167906.8, filed 14 Aug. 2009, the entire contents of each of which are hereby incorporated by reference.

FIELD OF THE INVENTION

The invention relates to a system for generating an identifying response pattern comprising a memory used as a physically unclonable function comprising a plurality of re-writable memory locations each memory location having at least two possible logical states, and an input for receiving an activation signal so as to cause each of said memory locations to enter one of its possible logical states, the entered state being dependent on physical, at least partially random characteristics of said memory, and thereby generating a response pattern of logical states useful for identifying the system.

The invention further relates to a method of generating an identifying response pattern and to a corresponding computer program.

BACKGROUND OF THE INVENTION

A Physical Unclonable Function (PUF) is a function which is embodied as a physical system, in such a way that an output of the function for an input is obtained by offering the input to the physical system in the form of a stimulus, and mapping the behavior that occurs as a result of an interaction between the stimulus and the physical system to an output. Wherein the interaction is unpredictable and depends on essentially random elements in the physical system, to such an extent, that it is unfeasible to obtain the output, without having had physical access to the physical system, and that it is unfeasible to reproduce the physical system. Preferably, a PUF is also easy to evaluate. For practical uses, PUFs are preferably low in manufacture costs.

Conventionally, an input or stimulus that a PUF accepts is called a 'challenge'. The output of a PUF, that is, the behavior the PUF exhibits after interaction with the stimulus, is called a 'response'. A pair comprising a challenge and the corresponding response of a PUF is called a challenge-response pair. Some types of PUFs allow a wide range of different inputs, some types allow a more limited range of inputs, or may even allow only a single input. Challenging a PUF with some single challenge may also be called an 'activation' of the PUF.

It would be most preferable, if a PUF when evaluated multiple times for the same challenge would produce multiple responses which are all equal. This property is not necessary though, and, in practice, most PUFs do not posses it. As long as the multiple responses lie sufficiently close to each other, the PUF can be usefully applied.

Since the interaction between a stimulus and the physical system cannot be predicted without access to the system, the PUF is hard to characterize and to model. The output of a particular PUF for an input can therefore only be obtained using the particular physical system underlying the particular PUF. Possession of a challenge-response pair is proof that at some point the challenge was offered to the unique physical system that underlies the PUF. Because of this property, i.e., the property that challenge-response pairs are coupled to a unique physical device, a PUF is called unclonable. By equipping a device with a PUF, the device also becomes unclonable.

Physical systems that are produced by a production process that is, at least in part, uncontrollable, i.e., a production process which will inevitably introduce some randomness, turn out to be good candidates for PUFs.

One advantage of PUFs is that they inherently possess tamper resistant qualities: disassembling the PUF to observe its working, will also disturb the random elements and therefore also disturb the way inputs are mapped to outputs. Various types of PUFs are known in the art, including various types of electronic PUFs, including various types of PUFs based on electronic memories. PUFs may also be based on other concepts, e.g., optical PUFs.

One way of constructing a PUF uses a static random access memory (SRAM); these PUFs are called SRAM PUFs. SRAMs have the property that after they are powered-up, they are filled with a random pattern of on-bits and off-bits. Although the pattern may not repeat itself exactly if the SRAM is powered-up a next time, the differences between two such patterns is typically much smaller than half the number of bits in the state.

A second kind of S-RAM PUFs is constructed with Dual Port RAM. By writing at the same time different information on both ports, i.e., challenging the RAM with the different information, the memory cell is brought into an undefined state, which shows a PUF-like behavior.

Due to unavoidable variations during production, the configuration of the components of an SRAM relative to each other is at least slightly random. These variations are reflected, e.g., in a slightly different threshold voltage of the transistors in the memory cells of the SRAM. When the SRAM is read out in an undefined state, e.g., before a write action, the output of the SRAM depends on the random configuration. Producing a new SRAM, with the same characteristic behavior requires producing an SRAM with the same configuration, a configuration which was achieved randomly. As this is unfeasible, the SRAM is unclonable as a physical system, that is, it is a PUF.

A further example of PUFs is the so-called Butterfly PUF. The Butterfly PUF comprises a plurality of butterfly PUF cells. A butterfly PUF cells comprises a cross-coupling of two latches or flip-flops. The butterfly PUF can be implemented on a Field Programmable Gate Array (FPGA), even if the FPGA does not comprise SRAM. The butterfly PUF cell can be viewed as a simulation of an SRAM memory cell using elements that are available on an FPGA. The way a butterfly operates is also similar to that of the SRAM. The butterfly PUF is also able to extract secrets from the complex physical characteristics of the integrated circuits on which it is implemented. Butterfly PUFs are explained more fully in the following paper: Sandeep S. Kumar, Jorge Guajardo, Roel Maes, Geert-Jan Schrijen, Pim Tuyls, "The butterfly PUF protecting IP on every FPGA,", pp. 67-70, 2008 IEEE International Workshop on Hardware-Oriented Security and Trust, 2008. The butterfly PUF is also described in the international patent application "identification of devices using physically unclonable functions", published as WO2009/024913, and incorporated herein by reference. See in particular FIGS. 8 and 10, and the corresponding description.

One application of PUFs is to derive a cryptographic key on an electronic circuit. The electronic circuit typically includes an integrated Circuit (IC) and/or programmable logic. The programmable logic comprises, e.g., a field-programmable gate array (FPGA), a programmable logic device (PLD), or a digital signal processor (DSP), a microprocessor, etc. Instead of storing the cryptographic key in a non-volatile memory of some kind, the key is generated from the PUF only when the key is needed by the device. The key can be deleted when it is no longer needed. The next time the key is needed, it can be derived again from the PUF. Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible values from noisy measurements is described, e.g., in international patent application WO 2006/129242, "Template Renewal in Helper Data Systems", which is included herein by reference.

One way to use a PUF to create a cryptographic key is as follows. First, during an enrollment phase, a challenge-response pair is created. Then, using the fuzzy extractor, helper data is created. On the device, the challenge and the helper data are stored in a non-volatile memory. To derive the cryptographic key, a new response is obtained by evaluating the PUF for the challenge again. By combining the new response with the stored helper data, according to a helper data algorithm, a key is derived. The helper data ensures that the key is the same, each time it is derived.

Without a PUF, the cryptographic key may be recovered by an attacker, by mounting a physical attack on the non-volatile memory where the key is traditionally stored. For example, the attacker may open the memory and probe its content. Using a PUF makes this type of attack much harder, since the sought PUF pattern only materializes when the PUF is activated. Moreover, opening the PUF will typically disturb the precise way in which the PUF interacts with inputs. Accordingly, information the attacker learns from his probe is not related to the interaction which was used to create the cryptographic key. This makes it harder for an attacker to find the key using a physical attack.

In other words, and attacker cannot intrusively open a chip comprising a PUF since he needs the chip to function in order for the PUF pattern to materialize and because opening the chip would destroy the capability of the PUF to produce the PUF pattern, on the other hand he must open the chip since otherwise he has no way of accessing the secret PUF pattern.

Unfortunately, there may be a way out of this dilemma for the attacker. Freezing a PUF based on an electronic memory after is has been activated may cause a PUF pattern to become temporarily fixed in the memory, even if the chip is deactivated and opened. The pattern becomes, as it were, frozen in the memory. After freezing the memory, an attacker can take the chip apart and determine what its memory content was at the time of freezing. Similar attacks are discussed in the paper: Halderman, A. J., S. D. Schoen, N. Heninger, W. Clarkson, W. Paul, J. A. Calandrino, A. J. Feldman, J. Appelbaum, and E. W. Felten (2009). Lest we remember: cold-boot attacks on encryption keys. *Commun. ACM* 52 (5), 91-98.

Examining a memory, after it has been frozen may be possible by extracting the memory from the system and reading out its contents in a different system. A countermeasure against this attack is to integrate the memory that is used as PUF in the system, instead of using a separate memory device, which may be extracted from the system separately. Even in the latter case, where the memory is an integrated part of the system, its content while frozen may be examined by opening the chip and looking at the inside using an electron microscope.

Freezing a memory may be done by such low-teach means as spraying the memory chip with an upside-down canister of multipurpose duster spray, also known as 'canned air'. Holding the can upside down will produce the required low temperatures. A more advanced technique is to apply liquid nitrogen to the memory chip. The latter procedure is found to produce even better results, i.e., more memory cells retain the value they had during operation before the freezing.

It is noted that a memory may be vulnerable to illicit access without freezing, for example, by probing a bus to the memory using thin micro-probes or needles that are stitched into a bus line. Nevertheless, we will collectively refer to all types of attack in which illicit access may be obtained to the content of a memory during its operational use, as a freezing attack.

It is a problem of the prior art that a PUF based on an electronic memory may be vulnerable to a freezing attack.

SUMMARY OF THE INVENTION

It is an object of the invention to avoid or mitigate the vulnerability of a memory based PUF to freezing attacks.

This and other objects are achieved by the system for generating an identifying response pattern according to the invention. The system for generating an identifying response pattern comprises a memory used as a physically unclonable function. The memory comprises a plurality of re-writable memory locations. Each memory location has at least two possible logical states. The memory has an input for receiving an activation signal so as to cause each of said memory locations to enter one of its possible logical states. The entered state depends on physical, at least partially random characteristics of said memory. Thereby a response pattern of logical states useful for identifying the system is generated. The system also comprises a memory-overwriting device configured for overwriting at least a first portion of the plurality of memory locations to obscure the response pattern in the memory.

At startup of the system the memory is activated which causes the memory locations to contain a sequence of logical states, i.e., the response pattern. This sequence of logical states depends on the physical, e.g. structural, variations present in the memory and is therefore suitable for identifications of the device.

The response pattern may be used in various ways. Example applications include identification of the device, or its owner, secure key generation and/or storage etc. For example, it may be used for identification as follows. The sequence of entered logical states may be compared to the contents of the same memory locations at a previous start-up of the device, and if the two sequences differ at fewer positions than can be explained by the natural deviations in the response pattern across different start-ups, one may conclude that the two sequences were obtained from the same device. That is, the device is identified. This type of identification is useful as a counterfeiting countermeasure. For example, a database may be filled with a response pattern obtained from all known genuine systems, for example, in a factory. In the field, a system can be verified to be genuine by comparing its response pattern with all response patterns in the database.

There are many other ways of using the response pattern. For example, using so-called helper data the response pattern may be corrected for its deviations from a response pattern obtained as a previous start-up of the memory. From the corrected response pattern, a cryptographic key may be derived. A cryptographic key can be used for a variety of functions, including, authentication, encryption, decryption, etc.

After the memory content has been used, e.g., after a cryptographic key has been derived, the system can be protected against freeze attacks by using the memory-overwriting device. The memory-overwriting device is configured for overwriting at least a first portion of the plurality of memory locations to obscure the response pattern in the memory. Overwriting the memory locations and obscuring the logical states therein is a countermeasure against the freezing attack. Overwriting the first portion in order to obscure its content may be done in various ways. For example, a fixed value, e.g., zero, or the hexadecimal value 'ff', may be used to overwrite the first portion. Alternatively, the first portion may be overwritten with random data. The random data may be, e.g., pseudorandom data, true random data or a combination thereof. The first portion may be fixed, for example, the memory locations of the first portion can be stored in a memory of the system. The first portion may also be determined as the result of a random generation process, possibly pseudo-randomly.

At the moment, an attacker freezes the memory, and opens the chip, or otherwise accesses the memory, he finds the memory's content at the first portion obscured. That is, logical states, e.g. values, that are present in the first portion are of no use to the attacker.

It is an insight of the inventors that in general it is not necessary to obscure the entirety of the plurality of memory locations. It is only needed to reduce the information content of the plurality of memory locations to such a level that an attacker can no longer make use of it, or at least to reduce it to such an extent that it would make his attack markedly harder. By partially obscuring the logical states, which may be obtained from a freezing attack, the amount of information on the response pattern or on entities derived from it, such as cryptographic keys, is reduced. Accordingly, a freezing attack is made more difficult.

For example, in the first identification example, it is sufficient if the number of differences between the current response pattern and a response pattern that was previously read from the memory locations is so high, that it cannot be explained any more by the naturally occurring variability in the memory. Accordingly, an attacker cannot use the logical state he obtains after the freezing to spoof the system. With spoofing, we mean the situation that an attacker may be able to build a device that acts in some ways indistinguishable from the genuine device. Note that even an attacker who obtains a copy of the response pattern will not be able to clone the device, in the sense that he cannot create a memory with the same start-up characteristics as a genuine device. Hence, on a physical level a genuine device and its copy will be distinguishable.

An attacker may conceivably make use of helper data designed to correct errors in the response pattern, which helper data he may have obtained in some possibly illicit manner. However, using such helper data only a limited number of errors can be corrected. How many errors can be corrected depends on the parameters used during the construction of the helper data. As long as the first portion is sufficiently large to guarantee that the number of errors present in the memory is larger than the number of errors that can be corrected with the helper data, a freezing attack is significantly hindered, if not outright thwarted. Even if the size of the first portion is such that it cannot be guaranteed that the number of errors present in the memory is larger than the number of errors that can be corrected with the helper data, the naturally occurring errors outside the first portion may be sufficient to at least make it likely that an attack will be much harder for an attacker.

It is noted that depending on the error correcting mechanisms employed with the helper data, the information present in a response pattern obscured at the locations in the first portion may still, at least information theoretically, give some small advantage to an attacker. However, by making the first portion sufficiently large, this advantage can be made as small as is desired.

The system may be comprised in a variety of different devices. For example, the system may be comprised in a mobile phone, a computer, a laptop, a netbook, a set-top box, an access control system, a smart card, an RFID tag, a router, a micro-controller. In general, the system may be usefully employed in any device, which needs to store or generate a cryptographic key for any cryptographic purpose, or which needs to generate a string which is likely to be unique for the device, i.e., which identifies the device.

The response pattern, possibly after errors have been corrected, e.g., using helper data, may be used to generate a cryptographic key. In the latter case, the system may be viewed as a system for generating a cryptographic key.

The memory can be a random access memory, a volatile memory, etc. For example, the memory may comprise SRAM, dual port RAM or a butterfly PUF. Actually, the memory can be any kind of memory that can be used as a PUF, which is susceptible to an attack that at least temporarily fixes its content so that it may be examined in some intrusive manner, and which can be overwritten.

A memory location that can take at least two possible logical states will be said to be capable of storing a 'bit'. The two values will be indicated as '0' and '1'. It is noted that some types of memory allow more than two possible logical states. For example, a multi-leveled memory location may be able to store, e.g., four voltage levels, and thus also four values.

The input for receiving an activation signal may be a power line used for powering-up the memory. For example, the memory locations of an SRAM will enter a logical state upon receiving power. For a dual port ram, the activation signal may also comprise writing different signals simultaneously on the two ports.

The physical, at least partially random characteristics of the memory may comprise, for example, slight structural variations in the components that make up the memory.

For example, there may be differences in the precise material used across different memory locations and across different memories. For example, doping levels may vary.

Overwriting memory locations may be done in various ways, for example, with a fixed value, with a predetermined fixed sequence, or with a truly random sequence. A predetermined fixed sequence may be generated with a pseudorandom number generator (PRNG). A pseudorandom number generator is an algorithm for generating a sequence of numbers that approximates the properties of random numbers. Known examples include linear congruential generators and linear feedback shift registers. A PRNG is typically started from a seed. The seed may be fixed in the system, e.g., in a non-volatile random access memory, e.g., a flash memory. The seed may also be fixed in a ROM, for example, as part of program code. The seed may also be derived from the PUF. One may also use a seed-less PRNG, e.g., the digits of an irrational number, such as Pi. Stream ciphers form a further example of PRNGs. They may also be used to generate the predetermined fixed sequence by generating a keystream.

The system may comprise a memory read-out device configured for reading out the response pattern from the memory.

The memory is preferably erased very early in the start-up sequence so as to avoid being subjected to a freezing attack just between start-up and overwriting.

In an embodiment, the system comprises a helper data memory, the helper data memory comprising error-correcting data for correcting deviations between the entered logical states and logical states previously read from the plurality of memory locations.

For some applications, it is desirable if the generated response is the same after any start-up of the system. For many types of memories, when they are used as PUF, this cannot be guaranteed. Most memory locations will enter the same logical state after receiving the activation signal multiple times, e.g., after the system is cold-booted or started multiple times. However, some memory locations may sometimes enter a different logical state after receiving the activation signal multiple times. If a cryptographic key is to be derived from the response pattern then this is undesirable.

One way to deal with this problem is designate one read-out of the memory locations as a special read-out, often called the enrollment data. The helper data contains error-correcting data to correct deviations from the enrollment data in the response pattern. For example, the helper data may comprise parity bits computed of multiple subsets of the enrollment string. Alternatively, the helper data may contain the exclusive-or sum of the enrollment data and a code word from an error correcting code having at least as many bits as there are in the plurality of memory locations.

In an embodiment, the first portion comprises all of the plurality of memory locations.

Overwriting all of the plurality of memory locations and thereby obscuring their contents from view of an attacker during a freezing attack has the advantage that the attacker will not learn any information through the use of this type of attack.

In an embodiment, the memory-overwriting device is configured for overwriting the helper data memory.

Typically, the content of the helper data memory will be needed upon a next use of the system, when deviations in the generated response must be repaired again. However, in some situations the helper data is not needed again.

For example, in systems that are arranged to be used only a predetermined, limited number of times, the helper data can be destroyed after the system is used for the final allowed time. For example, an RFID tag that is used in a ticket, which allows access to a venue, may be intended to be used only once. Once the ticket has been used, the RFID tag can destroy the helper data. The risk of an attacker somehow altering the ticket in such a way that it may be used again is thereby reduced.

A second circumstance in which it may be desirable to destroy the helper data is in a situation where the system has detected a tampering attempt, for example, through the use of an attack detector comprised in the system. For example, in a chip of the system, a light sensor may be embedded. As the light sensor is under a coating of the chip, it will, in normal circumstances, detect no light. However, if the coating of the chip is removed to gain easy access to its memory, the light sensor detects light. In that situation, the system can be reasonably sure that someone is intentionally tampering with its normal operation, that is, that the system is under attack. In that case, it is prudent to remove all information that may be helpful to an attacker, such as the helper data.

Similarly, in case tampering is detected, the first portion may be extended. For example, normally the system may overwrite only part of its memory locations, or none at all, but after the detection of an attack by an attack detector, it may overwrite all of the memory locations.

In an embodiment, the system comprises a tampering flag. The memory-overwriting device is configured for overwriting conditionally upon the tampering flag being set.

A tampering flag may be embodied as a flash memory, or as an electrically blowable fuse, etc. The flag may be set by an attack detector. A tampering flag is a useful extension to an attack detector. Consider the situation wherein an attack has been detected. If the PUF was not damaged by the attack or at least not severely enough, the attacker may deactivate the system and reactivate the PUF so that is takes on its usual start-up pattern. However, with a tampering flag this scenario will not work for the attacker. The system detects that the flag is set and erases the memory. It is a nuisance for an attacker if the device he is attacking becomes useless as soon as the device has detected a single one of his tampering attempts.

The tampering flag is preferably a write-once memory, such as a blowable fuse.

In an embodiment, the size of the first portion increased upon detecting that the tampering flag has been set. For example, it is increased to cover all of the plurality of memory locations.

In an embodiment, the memory-overwriting device is configured for overwriting the first portion of the plurality of memory locations with a fixed value, e.g., zero.

Overwriting with a fixed value can be done very quickly, and does not require a random number generator. However, there is a disadvantage to this type of overwriting. Consider a situation wherein each location in the first plurality indicates a byte of the memory, and consider that these bytes are overwritten with a zero byte. Although some zero bytes will occur naturally, it would be a reasonable assumption of an attacker who saw this memory that all zero bytes correspond with bytes of the first portion, i.e., with overwritten bytes. Although he still does not know what the original values were, at least he knows how many errors were approximately introduced and where. This disadvantage does not occur if the first portion is very large, in particular, if the first portion comprises all of the plurality of memory locations.

In an embodiment, the first portion indicates bit-locations distributed over all of the plurality of memory locations. Since zero (or one) bits occur relatively often, this avoids the problem noted above. An attacker, who assumes that all zero bits correspond with overwritten bits, will make a comparatively large error at least compared with the situation wherein bytes are overwritten.

In an embodiment, the memory-overwriting device is configured for overwriting the first portion of the plurality of memory locations with a sequence of random values.

The normal start-up pattern of a memory that is used as a PUF typically looks random. Therefore, if a sequence of random values is used for overwriting the locations in the first portion, an attacker will not be able to distinguish between overwritten locations and non-overwritten locations. In this embodiment, it makes no difference if the locations in the first portion address bits or bytes. Using this type of overwriting will make the situation for the attacker slightly worse, instead of knowing that certain locations were overwritten, he can now only suspect that locations were overwritten. He neither knows which ones, nor how many.

In an embodiment, the system comprises an exclusive-or device, wherein the memory-overwriting device is configured to obscure the response pattern in the memory by writing to the respective locations of the first portion of the plurality of memory locations an exclusive-or of the respective location's entered state and a respective value from a sequence of random values. An exclusive-or device may comprise an exclusive-or gate.

Some memories may only receive the activation signal once per boot-cycle. To regenerate the response pattern more often, the memory must be de-activated and re-activated.

Such cycles cost a relatively long time, and moreover have the disadvantage that any content stored in the memory, even data stored in locations of the memory outside of the plurality of locations, are lost. Nevertheless, it may be desirable for security reasons to be able to reconstruct the key. For example, the cryptographic key may have been erased after use, to avoid having it accidentally exposed, e.g., through a software bug. When the key is later needed again, it must be recomputed. This would be impossible if a sufficiently large first portion of the PUF memory had been overwritten.

This embodiment solves this problem. By overwriting a memory location with an exclusive-or of the logical state it entered after start-up and a random value, the logical state can later be reconstructed by performing the exclusive-or of the present memory values and the random value again. The present memory values are the result of the exclusive-or and the logical state entered after start-up. The exclusive-or has the property that applying it twice with a fixed value undoes its effect. On the other hand, the exclusive-or of a logical state and a random value is itself an random value, at least for someone, like an attacker, who does not know the random value. The effect of obscuring the memory is thus retained.

In an embodiment, the first portion of the plurality of memory locations and/or the sequence of random values is obtained by applying a pseudorandom function to a fixed random-number seed.

It is conceivable that an attacker somehow manages to obtain a read-out of the memory during operational use more than once. The attacker is not able to use any one of the so obtained response patterns because the obscuring done on the first portion. The attacker has no information on which ones of the obtained logical states he has obtained are correct, nor how many. However, if the attacker could compare two response values then he is able to accomplish this, by noticing which memory locations are the same and which are different. Although some of the differing memory locations will be due to natural variations, most of the differences will be caused by the application of obscuring on the first portion.

If the locations in the first portion differ, the attacker knows that one of the logical states found in the memory locations that changed in further obtained response patterns are likely correct. If the attacker obtained more than two response patterns corresponding to more than two activations, the attacker could use majority voting on the content of each memory location to determine its likely content. This problem can be avoided by ensuring that the locations in the first portion are the same after each activation. On the other hand, one wants the content of the first portion to be random. This problem can be solved by choosing the locations in the first portion not truly random but according to a pseudorandom number generator.

Similarly, if the values, which are used to overwrite the locations in the first portions, changes after a new activation it points out to the attacker which locations are in the first portion. To avoid leaking even this information to an attacker, the values used for overwriting can be chosen the same after each activation. This can be accomplished by choosing the sequence of random-numbers according to a pseudorandom number generator.

In particular, if the obscuring used the exclusive-or device, it is of advantage to use a pseudorandom number generator. When the obscuring must be undone, the first portion and the random sequence can be regenerated and reapplied. There is no need for the first portion and/or the sequence of random values to be stored, only the seed is needed.

In an embodiment, at least part of the sequence of random values is true random and at least part of the sequence of random values is obtained by applying a pseudorandom function to a fixed random-number seed.

In this embodiment, the data used for overwriting resembles even more closely the type of data that an attacker expects from a PUF. Consider an attacker who manages to obtain a relatively large number of multiple measurements of memory. Suppose that in some memory location he always sees the same memory value. The attacker may then reason as follows. If the memory location were not part of the first portion, than it would often be the same value, but not always, since natural variability would cause some variation in the measured data. Therefore, if the value is always the same it is likely part of the first portion. By making this observation for all of the memory locations, the attacker may be able to deduce to a large extent which memory location is in the first portion and which is not. That is the attacker would presume that memory locations that never change across his measurements belong to the first portion, and all those that sometimes change do not.

Hence, by introducing a little bit of noise in the data used to overwrite the first portion it is even harder to distinguish between the first portion and the real data. It is preferred that the number of bytes in the random sequence that are true random is approximately the same as the probability that a byte in a memory location differs from its usual start-up value.

In an embodiment, the random-number seed is dependent upon the identifying response pattern.

Preferably, the fixed seed depends on the PUF instead of on a predetermined stored value. If an attacker manages to obtain a response pattern of a different instance of the same system, he can compare the two responses. If both use the same first portion then their response patterns would agree at exactly those memory locations that are in the first portion. This can be avoided if the seed depends on the PUF. Preferably, the seed depends on the enrollment data, that is, on a corrected version of the response pattern.

In an embodiment, the generation of the response pattern is sensitive to degradation after repeated applications of the activation signal. The embodiment of the system comprises an anti-degradation device configured to write to each respective location of a second portion of the plurality of memory locations, the second portion being preferably disjoint from the first portion, an inverse of a logical state previously read from the respective location of the second portion.

It has been found that memories such as SRAM and more in general those memories based on feedback effects, such a cross-coupled latches, flip-flops, transistors etc, are sensitive to degradation after repeated applications of the activation signal. That is, after the system has been activated repeatedly the response pattern that is obtained from the memory is drifting away from an enrolment data. Compared to previous read-outs of the memory more and more memory locations enter a different logical state when they are activated. The degradation effect is also called 'aging'.

This phenomenon is particularly problematic if the PUF is to be used for longer periods of time and after a large number of start-ups. Up to a point, error-correcting mechanisms can correct for this behavior by correcting the new deviations, but at some point the response pattern will contain too many errors for them to be corrected.

One mechanism that may cause the problematic degrading is Negative Bias Temperature Instability (NBTI), also known as burn-in. NBTI causes the generation of interface traps under negative bias conditions in pMOS transistors, and thereby causes the threshold voltage thereof to decrease. As a result, the start-up behavior of the affected memory cells changes over time.

It is observed that the degradation effect can be reduced by overwriting memory cells with the inverse value of a value previously read. There are several ways to accomplish this. For example, one could read the logical state of a memory cell after start up, compute the inverse of that logical state, and write the inverse of the logical state back to the memory cell.

Although writing an inverted logical state back to a memory location slows the degradation process, there is a drawback involved. If an attacker manages to freeze the memory and read out the memory, he obtains an inverted copy of the secret response pattern. Simply be inverting the pattern that he finds, an attacker can reconstruct the response pattern that he is looking for. From the response pattern, he may be able to spoof the device, or to derive the system's secret cryptographic keys.

Preventing aging by overwriting the memory with the inverse of the previously obtained content of that memory is further described in the international patent application with application number PCT/IB2009/051592 and title "Method of reducing the occurrence of burn-in due to negative bias temperature instability", which is included herein by reference.

It is a further insight of the inventor that is not necessary to slow the degradation for all of the memory cells. Instead, the anti-degradation can be used on some of the memory locations, that is, on the locations in the second portion, whereas on some other locations the anti-freezing countermeasure is used. As noted, some level of error can be tolerated in the response pattern. For example, for some applications some number of errors can be tolerated. In the anti-counterfeiting example given above, it may not be a problem if some small number of additional errors is introduced. The additional errors can be compensated by increasing the number of expected deviating memory locations. For other applications, a number of additional errors may be repaired by the helper data.

The content of the first portion may be chosen differently upon each start-up, this causes the anti-freezing countermeasure to be applied to a memory location only occasionally, which reduces the effect of not applying the anti-aging countermeasure. Yet after any activation some portion of the memory locations are obscured.

In an embodiment, the union of the first portion and the second portion together comprise all of the plurality of memory locations. In a further refinement the first portion may contain some small number of bit locations, say 16-bit locations spread over the plurality of memory locations. Some, but probably not all, of the small number of bit locations will contain additional errors. The exact numbers depend on the memory type and can be decided experimentally, e.g., by repeatedly performing the method and counting the number of deviations. Say, a quarter of the bits will at some point be deviating. By choosing a more powerful error-correcting algorithm, the helper data may correct the additional 4 errors.

To an attacker, however, the 16 additional changes will result in 8 additional errors on average. The 8 additional errors are added to the errors an attacker will incur because of his intrusive method. E.g., freezing is only effective for some percentage of the bits, opening a chip will cause damage to some of the memory locations, etc. In other words, even though the first portion does not cover all of the plurality of memory locations, it reduces the value of the generated response pattern for attacking purposes. At some point, the attacker will not be able to reconstruct the correct enrolment data, even if he has access to the helper data since the response pattern that he finds simply contains too many errors.

In other words, not using the anti-degradation on some memory locations, but instead overwriting those locations, is a larger problem for the attacker than for legal applications, since even without anti-aging not all of those cells will start to deviate. Using an anti-freezing countermeasure on some memory locations and an anti-aging countermeasure on others protects the entire memory against both freezing and aging.

Note that if so desired, some memory locations may not belong to the first portion nor to the second portion.

In an embodiment, the system comprises an enrollment-string reconstruction device to reconstruct the logical states previously read from the plurality of memory locations configured to apply an error-correcting function to the error-correcting data and to the entered logical states to correct deviations between the entered logical states and the logical states previously read, wherein the anti-degradation device is configured to write to each respective location of the second portion of the plurality of memory locations an inverse of the reconstructed logical state previously read from the respective location of the second portion.

It has been found that a better prevention of degradation of the generation of the response pattern is accomplished by always overwriting the memory cell with the same response pattern. This may be achieved as follows. At some point, a read-out of the memory is made, for example, at the first start-up of the memory, which response pattern is stored so that the memory can later be overwritten with this response pattern. Such a response pattern is sometimes called 'golden start-up values'. Note that instead of storing the response pattern itself, one could also store the inverse of the golden start-up values.

However, storing a response pattern represents a security risk. When a PUF is used for security applications, the content of the PUF is secret. In fact, one often goes to considerable length to preserve this secret. If the content of the PUF, or a string which is directly related to it, such as an inverse, were to be stored in some other memory somewhere on the chip, then one runs the risk that this copy is compromised. Instead of attacking the PUF to obtain a copy of its memory, an attacker may attack the stored golden start-up values.

This embodiment addresses this problem, using the response pattern as it was read and the helper data the deviations in the response pattern from the enrollment response pattern may be repaired. At least this is possible when the degradation has not yet progressed to the point where the response pattern contains to many deviations from the enrollment data. In this way, logical states previously read from the plurality of memory locations are reconstructed, to be precise the enrollment data which was used to create the helper data, is reconstructed. By inverting this data and write it to the memory locations in the second portion their ageing is slowed stronger than would be the case when the current response pattern was used. However, the helper data need not be correlated with the response pattern. Although an application may whish to keep the helper data secret as a pre-caution, access to the helper data alone without a response pattern cannot be used to reconstruct enrolment data.

Using helper data to reconstruct enrolment data and using the inverted helper data to slow degradation of response pattern generation is considered an independent invention, which may be employed without an overwriting device. For example as in the following system: A system for generating an identifying response pattern comprising a memory used as a physically unclonable function comprising a plurality of re-writable memory locations each memory location having at least two possible logical states, and an input for receiving an activation signal so as to cause each of said memory locations to enter one of its possible logical states, the entered state being dependent on physical, at least partially random characteristics of said memory, and thereby generating a response pattern of logical states useful for identifying the system, the generation of the response pattern being sensitive to degradation after repeated applications of the activation signal, an anti-degradation device configured to write to each respective location of at least a portion of the plurality of memory locations an inverse of a logical state previously read from the respective location of the portion, and an enrollment-string reconstruction device to reconstruct the logical states previously read from the plurality of memory locations configured to apply an error-correcting function to the error-correcting data and to the entered logical states to correct deviations between the entered logical states and the logical states previously read, wherein the anti-degradation device is configured to write to each respective location of the portion of the plurality of memory locations an inverse of the reconstructed logical state previously read from the respective location of the portion.

In an embodiment, the anti-degradation device is configured to write to each respective location of the second portion of the plurality of memory locations an inverse of the entered logical state at the respective location of the second portion.

Using the available start-up values has the advantage that no computations are required before the anti-aging countermeasure can be applied. Even if helper data is present and can be used to reconstruct golden start-up values, it will take some time before this is done and the anti aging countermeasure can be applied. For example, the following sequence of events may take place during start up. After start-up, each logical state in each memory location of the plurality of memory locations is replaced by its inverse, and then helper data is used to reconstruct the enrollment data, working from the inverted logical states in the memory. The enrollment data is used for PUF applications, e.g., to generate a cryptographic key, e.g., by using a key-derivation function. Next, the inverse of the enrollment data is written at least to the second portion of the plurality of memory locations. For most memory locations, this will not cause a difference. However, at those places where the memory locations deviated from the enrollment data the logical state will be changed. Finally, the locations in the first portions are obscured, e.g., overwritten with random data.

In an embodiment, the system comprises a temperature-sensor, wherein the anti-degradation device is configured to write to the second portion conditionally upon a temperature measurement of the temperature-sensor being above a predetermined upper temperature threshold.

It has been observed that the aging problem is more pronounced at higher temperatures than at lower. In particular, the NBTI effect becomes larger with temperature. It is therefore more important to apply anti-aging countermeasures at higher temperatures. Most of the time, while the device is in normal operating conditions, applying the anti-aging countermeasure is not necessary, or at least the detrimental effects of not-applying anti-aging can be accommodated by other means, e.g., by the helper data. For example, an embodiment may work as follows. After startup the system determines the current temperature, if the temperature is lower than the upper temperature threshold, all of the memory is overwritten with random data. If the temperature is higher than the upper temperature threshold, the anti-aging is applied to at least a second portion of the memory locations.

In an embodiment, the system comprises a temperature-sensor, wherein the memory-overwriting device is configured for overwriting at least a first portion of the plurality of memory locations conditionally upon a temperature measurement of the temperature-sensor being below a predetermined lower temperature threshold.

An indication that a freezing attack may be imminent is that the current temperature is below a certain predetermined lower temperature threshold. For example, that the temperature measurement is below a typical operating temperature is an indication that someone is cooling the system. By only overwriting the first portion when the likelihood of a freezing attack is larger, which is presumably a rare event, the system can use anti-aging countermeasures most of the time. In this way both a good defense against freezing attack is obtained, since the anti-freezing attack countermeasures are employed when such an attack is more likely, and a good defense against aging is obtained, since anti-aging countermeasures may be applied most of the time. For example, the second portion may be extended to cover all of the plurality of memory locations, whenever the temperature measurement is above the lower threshold.

Determining the upper or lower threshold is a trade-off between security and the possibility of false alarms. The typical operating temperature may be determined by repeatedly measuring the system's operating temperature during normal operation. The lower threshold may be set to the operating temperature found in a large sample. To reduce the possibility of false positives further the threshold may be decreased with a safety margin of, say, 10%.

In an embodiment, the memory-overwriting device comprises a tuning parameter input for receiving a tuning parameter, the memory-overwriting device being configured to set the proportion between the number of locations in the first portion and the number of locations in the second portion in dependency upon the tuning parameter.

During the manufacture of the system, the exact properties of the memory may be unknown. When the first portion is chosen large, the freezing attack is likely to fail. When the second portion is chosen large, the aging is likely to be slowed considerably. The exact proportion between the two depends on the severity of the aging and the ease with which a freezing attack may be performed. Advantageously, this proportion can be set after manufacturing the system, when field-testing data is available.

A further aspect of the invention concerns a method of generating an identifying response pattern from a memory used as a physically unclonable function, the memory comprising a plurality of re-writable memory locations each memory location having at least two possible logical states, the method comprising applying an activation signal to an input of the memory so as to cause each of said memory locations to enter one of its possible logical states, the entered state being dependent on physical, at least partially random characteristics of said memory, and thereby generating the response pattern of logical states useful for identifying the memory, reading out the response pattern from the memory, wherein the method further comprises overwriting at least a first portion of the plurality of memory locations to obscure the response pattern in the memory.

In an embodiment, the memory comprises any one of static random access memory, dual-port ram or butterfly cells.

In an embodiment of the method of generating a response, the generation of the response pattern is sensitive to degradation after repeated applications of the activation signal, comprising writing to each respective location of a second portion of the plurality of memory locations, the second portion being preferably disjoint from the first portion, an inverse of a logical state previously read from the respective location of the second portion.

An embodiment of the method comprises obtaining a temperature measurement and writing to each respective location of a second portion of the plurality of memory locations conditionally upon the temperature measurement being above a predetermined temperature threshold.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. The computer program may be embedded as configuration data which when loaded into a configurable electronic circuit, e.g., an FPGA, configure the electronic circuit to perform a method according to the invention.

In a preferred embodiment, the computer program comprises computer program code means adapted to perform all the steps of a method according to the invention when the computer program is run on a computer. Preferably, the computer program is embodied on a computer readable medium.

Systems for generating an identifying response pattern comprising a memory used as a physically unclonable function configured for generating a response pattern dependent on physical, at least partially random characteristics of said memory may be vulnerable to freezing attacks and to aging. A memory-overwriting device configured for overwriting at least a first portion of the plurality of memory locations to obscure the response pattern in the memory avoids freezing attacks. An anti-degradation device configured to write to each respective location of a second portion of the plurality of memory locations an inverse of a response previously read from the memory reduces the effects of aging.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

Figure 1:
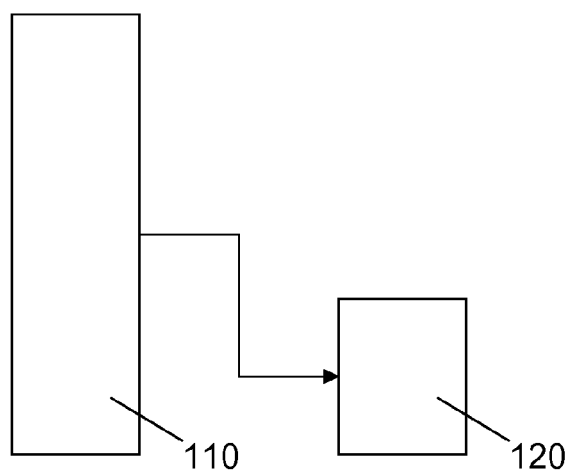
FIG. 1 is a block diagram illustrating a first embodiment of the system for generating an identifying response pattern according to the invention.

List of Reference Numerals:

| | |
|---|---|
| 100 | a system for generating an identifying response pattern |
| 110 | a memory-overwriting device |
| 120 | a memory used as a physically unclonable function |
| 130 | a helper data memory |
| 140 | an enrollment-string reconstruction device |
| 150 | a pseudorandom number generator |
| 160 | an anti-degradation device |

-continued

List of Reference Numerals:

| | |
|---|---|
| 170 | a temperature-sensor |
| 200 | a system for generating an identifying response pattern |
| 300 | a method according to the invention |
| 310 | applying an activation signal to an input of the memory |
| 320 | reading out the response pattern from the memory |
| 330 | obtaining a temperature measurement |
| 340 | determine if the temperature measurement is below a predetermined lower temperature threshold |
| 350 | overwriting at least a first portion of the plurality of memory locations |
| 360 | writing to a second portion of the plurality of memory locations, an inverse of a logical state previously read from the respective location of the second portion |
| 400 | a smart card |
| 410 | an integrated circuit |
| 420 | a card |

The invention is further explained by way of example with reference to the accompanying table 1, which is further described below.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates a first embodiment of the system for generating an identifying response pattern.

Shown in FIG. 1 is a memory 120, which can be used as a physically unclonable function. Memory 120 comprises a plurality of re-writable memory locations (not shown in FIG. 1). A memory location can take at least two possible logical states. If memory 120 were not used as a PUF, then its logical states would typically be used to represent some data stored in the memory. However, when memory 120 receives an activation signal on an input (not shown) the system causes each of the memory locations to enter one of its possible logical states, which makes memory 120 suitable for use as a PUF. That is, the content of the memory locations of memory 120 after receiving the activation signal depends on the physical, at least partially random characteristics of said memory. For example, they inherently depend on the physical configuration of the constituting components of the memory, e.g., their relative arrangement.

For example, an activation unit of system 100 (not shown) can deliver the activation signal to memory 120. The activation signal is preferably delivered shortly after start-up of system 100. For example, the activation signal could be delivered to memory 120 as part of a boot-up sequence. Such an activation unit may be part of system 100, but may also be part of a different system. For example, a system 100 may be comprised in a smart card, and the activation unit may be comprised in a smart-card reader.

Some number of the memory locations may be grouped into larger units. For example, the memory may be organized in, e.g., bytes, words, etc. This makes no difference for using the invention however, which may be applied regardless of the organization of the memory.

For example, memory 120 could be an SRAM whose start-up pattern in its memory locations behaves as a PUF. In that case, the activation signal may simply be given by applying power to a power line of memory 120. For example, memory 120 could be a dual port RAM, in which case the activation signal comprises writing simultaneously on both ports of the RAM. Other memories used as a PUF may yet have different activation patterns.

If the physical characteristics of said memory have not changed, than a second activation of the memory will cause most of the memory locations to enter the same logical state a second time. Moreover, since the physical characteristics are at least partially random, they together form a response pattern of logical states, which is useful for identifying the system. Some variation in the logical state in which a memory location enters after the activation signal is received multiple times can be tolerated since some variation does not affect the identifying capabilities of the response pattern. Note that some intermediate action may be necessary to prepare the PUF for a further activation. For example, it may be required to power-down memory 120.

The response pattern may be used in many different ways. For example, the response pattern may be used 'as is' to identify the system. The response pattern may also be processed further, for example to reduce or remove its mentioned variation.

System 100 further comprises a memory-overwriting device 110. Memory-overwriting device 110 is configured for overwriting at least a first portion of the plurality of memory locations to obscure the response pattern in the memory.

The activation signal and reading of the response pattern typically takes place before the memory-overwriting device 110 is used. This is not necessary though, for example, sometimes system 100 may be used without a need for the response pattern, in such a case, memory 120 may be overwritten before an activation signal is dispatched to memory 120.

If an attacker could obtain the content of memory 120 there could be a variety of undesirable consequences. For example, if the response pattern is used to derive a content key, than the attacker may be able to derive the content key from the response pattern himself. Any content which was encrypted with the content key can than be decrypted and accessed by the attacker. For example, if the response pattern is used to derive an authentication key, then an attacker with access to the response pattern may be able to pass himself or one of its systems off as the real system 100 by using the authentication key, e.g., in an authentication protocol.

Overwriting memory 120 has the advantage that from that moment onwards, an attacker of the system can no longer obtain the response pattern. Even if he obtains access to memory 120, he will not obtain the response pattern since it was overwritten.

For example, memory-overwriting device 110 may overwrite memory 120 completely, e.g., with a fixed value, such as zero, or with a true or pseudorandom sequence. A true random sequence may be obtained by using a true random number generator (not shown). Many designs for true random number generator exist, for example, one may be obtained by amplifying noise generated by a resistor, also known as Johnson noise, or by a semi-conductor diode, etc.

Memory-overwriting device 110 may also overwrite memory 120 partially, by overwriting a first portion which does not comprise all of the plurality of memory locations. For example, memory-overwriting device 110 may overwrite every other memory location in memory 120. For most applications of the response pattern overwriting half of the memory locations is enough to make the resulting response pattern useless to an attacker. Overwriting only part of the memory locations can be done faster, hence the amount of time the memory's content is vulnerable is reduced.

System 100 may comprise a tampering flag (not shown). Memory-overwriting device 110 may be configured to detect the presence of the flag. Only, when memory-overwriting device 110 detects that the flag is set, will it overwrite the first portion. Alternatively, memory-overwriting device 110, may be configured to overwrite, say, a quarter, or half of the memory locations, but increase this to all of the plurality of memory locations, when it detects that the flag is set. The tampering flag may be implemented using non-volatile random-access memory, using write-once memory (WORM), using an electrically blowable fuse, etc. Setting of the tampering flag may be performed by a tampering detection device (not shown) which is configured to detect tampering attempts on system 100. The tampering detection device may comprise many known tampering detection techniques, for example, the tampering detection device may comprise a sensor for detecting a breach in the housing of system 100.

Figure 2:
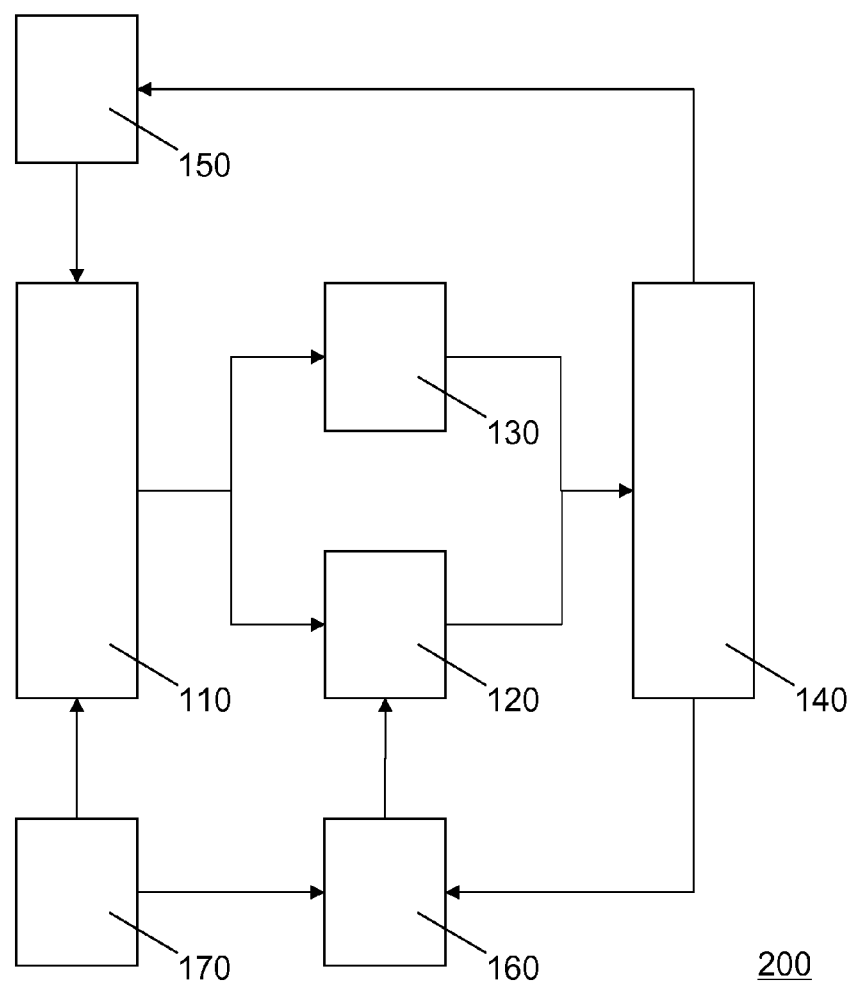
FIG. 2 is a block diagram illustrating a second embodiment of the system for generating an identifying response pattern according to the invention.

FIG. 2 illustrates system 200, a second embodiment of the system for generating an identifying response pattern, which has many refinements compared to system 100.

System 200 comprises an anti-degradation device 160. The anti-degradation device 160 is configured to oppose the aging effects in memory 120. The anti-aging device is configured to invert the contents of the memory locations found in memory 120 in a second portion of the plurality of memory locations. The second portion may be chosen such that the first and second portions together comprise all of the plurality of memory locations. The second portion is preferably disjoint from the first portion. Note that even though the second portion is disjoint from the first portion, one may employ a method as the following: first invert all of the memory locations of memory 120 and then overwrite the first portion. This has the net effect that a first portion is overwritten and a second portion, disjoint from the first portion is inverted. The latter method has better anti-aging characteristics.

Inverting a memory location which comprises a number of bits can be done be xor-ing each bit with a '1' value. That is, replacing a logical 1 value with a logical 0 value, and a logical 0 value with a logical 1 value. For example, a byte may be inverted by xor-ing it with the hexadecimal value 'ff'. A memory location that can take more than two values is preferably inverted to the value that best delays aging. This may be determined by repeatedly inverting using multiple memory samples, a particular value with one of the possible inversions and determining which memory sample ages slowest.

The inversion is preferably done relatively soon after the activation signal, e.g., soon after start-up of the system, for example, during a boot-up sequence. The overwriting and inverting may be combined but this is not necessary. For example, the memory could be, memory 120 may be inverted immediately after start-up, but the first portion may be overwritten only after use of the memory 120 was made, for example, to derive a key. Alternatively, the memory is inverted after is has been used. Note that any algorithm that can use memory 120 may be adapted to use memory 120 after it has been inverted, simply adapting it to take inverted values instead of the non-inverted values.

System 200 optionally comprises a helper data memory 130 and an enrollment-string reconstruction device 140. If memory 120 has some variability across multiple activations, as may often be the case, it is preferred for some applications to remove this variability. For example, if a cryptographic key is to be derived from memory 120, e.g., by using a key derivation algorithm, such as a hash function, then a variation in memory 120 might cause the key to vary as well, which is undesirable. Note that memories 120 and 130 may be integrated in one memory device, e.g. a memory chip.

During an enrollment phase of system 200, the content of the plurality of memory locations is read out. This may for example be the first activation of memory 120, although it may also be a later activation. The resulting response pattern of logical states is called the enrollment string. The enrollment-string reconstruction device 140 seeks to reconstruct the enrollment string from a response pattern that is read from memory 120 after a later activation, even though the later response pattern may contain variations, i.e., errors, with respect to the enrollment string.

During the enrollment phase, error-correcting data is constructed from the enrollment string and stored in the helper data memory 130. Later, enrollment-string reconstruction device 140 can reconstruct the enrollment string using an error correcting algorithm reconstruct from the later response pattern and the error correcting data. Enrollment-string reconstruction device 140 may have access to memory 120 and 130 for this purpose. Note that the activation signal is regarded as a type of challenge and the response pattern is regarded as the corresponding response. The error correcting data is also known as 'helper data'. The general concept of computing helper data for the purpose of reconstructing the enrollment string is known to persons skilled in the art.

Figure 3:
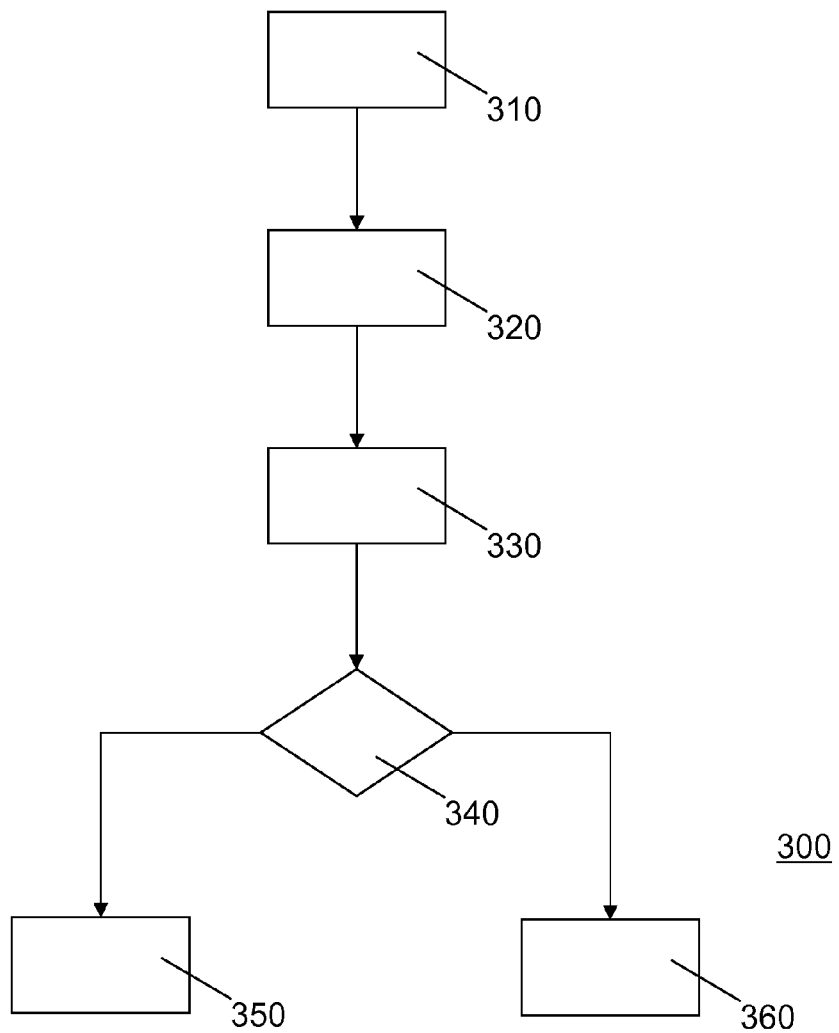
FIG. 3 is a flow chart illustrating a method of the system for generating an identifying response pattern according to the invention.

For example, international patent application published under WO 2006/053304 describes how such error correcting data may be computed and how the enrollment string may be reconstructed; see for example, FIG. 3 and the accompanying description. This patent application also gives more details on how keys may be derived from a response pattern.

The construction and use of error correcting data to reconstruct an enrollment string is described more fully in, for example, J. P. Linnartz, P. Tuyls, 'New Shielding Functions to Enhance Privacy and Prevent Misuse of Biometric Templates', In J. Kittler and M. Nixon, editors, Proceedings of the $3^{rd}$ Conference on Audio and Video Based Person Authentication, volume 2688 of Lecture Notes in Computer Science, pages 238-250, Springer-Verlag, 2003 and Y. Dodis et al, 'Fuzzy extractors: How to generate strong keys from biometrics and other noisy data', Advances in cryptology-Eurocrypt 2004, Ser. LNCS, C. Cahin and J. Camenisch, Eds., vol. 3027. Springer-Verlag, 2004, pp. 523-540.

For example, a BCH code can be selected with a word size larger than the plurality of memory locations. A response pattern of memory 120 is read and xor-ed with a random code word of the BCH code, the result is stored in memory 130. At a subsequent activation, the response pattern is xor-ed with the content of memory 130 and error-corrected using the BCH algorithm. The resulting error-corrected code word is xor-ed again with the content of memory 130, resulting in the original response pattern, i.e., the enrollment string.

If system 200 uses a memory 130 and enrollment-string reconstruction device 140 then anti-degradation device 160 may employ this as follows. After enrollment-string reconstruction device 140 has reconstructed the enrollment string, anti-degradation device 160 can write the inverse of the enrollment string to the second portion of memory 120. Again, anti-degradation device 160 could first write the enrollment string to the second portion, or to all of memory 120, and then memory-overwriting device 110 can overwrite the first portion. Alternatively, memory-overwriting device 110 can first overwrite the first portion and then anti-degradation device 160 could write the inverse of the enrollment string only to the memory locations corresponding to the second portion. Writing the inverse of the enrollment string to memory 120 instead of the inverse of the entered logical states further delays aging of memory 120.

Optionally, system 200 may comprise a pseudorandom number generator 150. Pseudorandom number generator 150 is configured to produce a pseudorandom sequence. For example, pseudorandom number generator 150 uses a stream cipher. The general concept of generating a pseudorandom sequence is known to persons skilled in the art. The quality of the pseudorandom sequence, that is, how hard it is to distinguish the pseudorandom sequence from a truly random sequence is a security trade-off. The larger the first portion is, the better the quality of the random numbers ought to be. It is preferred if the pseudorandom sequence is equidistributed.

Pseudorandom number generator 150 may be configured to generate its sequence starting from a seed. The seed may be stored in a memory of system 200 (not necessarily memories 120 or 130). The seed can be fixed in a program of system 200. For example, the seed may be chosen to be 0, or any other random but fixed number. The seed may also depend on the response pattern. In case, memory 200 uses memory 130 and enrollment-string reconstruction device 140, the seed may also depend on the enrollment string. For example, the seed could be a number of bytes, say the first 4 bytes, of the enrollment string, or of a hash thereof. In case, enrollment-string reconstruction device 140 produces a fixed code word, the seed may also depend on the code word.

This has the advantage that the pseudorandom sequence is fixed, which advantage is also obtained by using a fixed seed, but at the same time, the pseudorandom sequence is more-or-less unique for the particular embodiment of system 200, since the seed depends on a PUF, i.e., memory 120. If the seed is sufficiently large and depends on a sufficiently large part of the PUF, compared to the number of instances of the system 200, the pseudorandom sequence is unique for the device.

A random sequence, such as truly random or pseudorandom sequence, can be used for overwrite a memory location. For example, for each memory location in the first portion, memory-overwriting device 110 selects a next element of the random sequence and writes it to the memory location. To make the random data resemble real PUF output even closer memory-overwriting device 110 can change part of the random sequence with some low probability, for example, using a true random number generator (not shown).

In the absence of a true random number generator some other source of at least slightly random information may be used, such as a system clock, temperature sensor etc.

A random sequence, e.g. truly random or pseudorandom, can also be used to select the first portion itself. For example, a correspondence may be set-up between the random values of the random sequence and the plurality of memory locations. A next value of the random sequence is determined, and using the correspondence, a next location of the memory is obtained, until the first portion has a desired size.

Instead of overwriting with data which is independent of the original entered state of the memory locations, a memory location can also be obscured with data which is dependent upon original entered state. For example, the content of the memory locations may be encrypted, e.g., using AES or RSA. The key used for encrypting may depend on the identifying string, and preferably depends upon the reconstructed enrollment string. When the content of memory 120 is later needed, the content can be reconstructed by decrypting the first portion and inverting the second portion.

Alternatively, the system may comprise an exclusive-or device (XOR) (not shown). Memory-overwriting device 110 may combine a pseudorandom sequence of pseudorandom number generator 150 with the content of the memory locations in the first potions using an exclusive-or operation. The exclusive-or operation has the advantage that when it is applied twice, the original content of the memory is recovered. In this way, simply by keeping the seed used by the pseudorandom number generator 150, the content of the memory can be recovered when needed.

If system 200 has a memory 130, then memory-overwriting device 110 may be configured to overwrite it as well. Although, information theoretically the helper data in memory 130 need not contain any information on the response pattern or enrollment string, it is considered safer to remove the helper data when it is not needed anymore. This has the advantage that if an attacker manages to obtain a copy of memory 120, he may still be prevented from obtaining a copy of memory 130. This means that an attacker will not know how to repair errors in the response pattern. If the enrollment string is used to, e.g., derive a cryptographic key, this is can be a serious burden. Memory-overwriting device 110 may have access to memory 130 for the purpose of overwriting it.

System 200 optionally comprises a temperature-sensor 170. Temperature-sensor 170 may be used to obtain a temperature measurement. The temperature measurement may be used by any one of memory-overwriting device 110 and anti-degradation device 160.

Memory-overwriting device 110 may use the temperature measurement as follows. When the temperature measurement is below a predetermined lower temperature threshold, memory-overwriting device 110 overwrites the first portion as usual. However, if the temperature measurement is not below the predetermined lower temperature threshold, memory-overwriting device 110 does not overwrite the first portion. Alternatively, memory-overwriting device 110 could also expand the first portion if the temperature measurement is below a predetermined lower temperature threshold, and/or reduce the first portion if not.

Anti-degradation device 160 may use the temperature measurement as follows. When the temperature measurement is above a predetermined upper temperature threshold, anti-degradation device 160 inverts the second portion as usual. However, if the temperature measurement is not above the predetermined upper temperature threshold, anti-degradation device 160 does not invert the second portion. Alternatively, anti-degradation device 160 could also expand the second portion if the temperature measurement is above a predetermined upper temperature threshold, and/or reduce the second portion if not.

Note that it is not needed that system 200 uses both an upper and a lower temperature threshold. In an embodiment, both an upper and a lower temperature threshold may be used as follows: If the temperature measurement is below the lower temperature threshold all of the plurality of memory locations are overwritten. If the temperature measurement is above the upper temperature threshold all of the plurality of memory locations are inverted. If the temperature measurement is in between the lower temperature threshold and the upper temperature threshold, then a part of the memory location is overwritten and another part is inverted. This embodiment has the advantage, that is overwrites the most if the freezing risk is highest, it inverts the most when damage through aging is the most (aging being more severe at higher temperatures) and in between these extremes it does some of both. At all temperatures, the protection which is needed most is available.

The upper and/or lower threshold may be predetermined and fixed in system 200, e.g. stored in a memory. However, they may also later be uploaded to system 200.

Optionally system 200 comprises a tuning device (not shown) which has access to both memory-overwriting device 110 and anti-degradation device 160. The tuning device is configured to receive from outside system 200 a tuning parameter. The tuning parameter indicates what fraction of the memory should be covered by the first portion and what fraction by the second portion. If the first and second portions combine to the whole memory 120 then a single parameter may suffice. For example, the tuning parameter may be representative of a percentage; for example, the percentage of the plurality of memory locations which should be covered by the first portion. The tuning device may forward percentages to memory-overwriting device 110 and anti-degradation device 160. The tuning device may also compute what the desired sizes of the first and second portions should be and forward those sizes to memory-overwriting device 110 and anti-degradation device 160, respectively.

Instead of receiving a tuning parameter, e.g., from outside the system, the tuning device can also compute the tuning parameter itself from a temperature measurement. For example, the tuning device may comprise a table converting temperatures to portions sizes. In an embodiment, the tuning parameter is only used between the lower and upper temperature threshold.

The operation of an embodiment according to the invention is further explicated using table 1, below. The rows of Table 1 are numbered from 1 to 5, indicated in the first column. Values in table 1 are indicated with hexadecimal numbers, ranging from 00 to ff. The numbers and sizes of this example are exemplifying only. Starting with the second column, each column corresponds to a memory location.

Row 1 of table 1 has 16 further columns, which show the content of memory 120 after start-up. Memory 120 is organized in bytes. Shown are 16*8=128 bits.

Enrollment-string reconstruction device 140 has reconstructed the enrollment string, i.e., an earlier response pattern of memory 120, from the contents of the first row and helper data. The helper data is not shown in table 1. The reconstructed enrollment string is shown in row 2. Note that some of the values in the enrollment string are the same as the entered logical states shown in row 1. It is assumed that about 1 in 8 bits (12.5%) vary across multiple activations. For other memories 120, this number may both lower and higher, as the number depends on the type of the used memory. It is preferred to determine the error rate for each type of memory.

Memory-overwriting device 110 determines which memory locations will be included in the first portion. It is decided that about 25% of the memory locations should be overwritten. To this end a random sequence is produced, which is shown in row 3. Each memory location which is in the same column as a random number of row 3 which is less than 40 (hex) is included in the first portion. Since 40 is 25% of 100=(ff+1), the result will be that about 25% of the plurality of memory locations are included in the first portion. As noted above many alternatives of determining the first and/or second portion. Row 3 could have been produced by using a true random number generator or by using pseudorandom number generator 150 possibly with a fixed seed. Row 3 could have been produced by using pseudorandom number generator 150 with a seed based on row 2 of table 1. Row 4 indicates which memory location is included in the first portion with an R (for 'random'). The remaining memory locations are indicated with an A (for 'anti-aging'); they are included in the second portion.

Next, memory-overwriting device 110 overwrites the memory entries indicated with an R with random data. The random data is taken from a further random sequence (not shown in table 1), which may be true or pseudorandom. The entries indicated with an A are overwritten with the inverse of row 2. The result is shown in row 5 of table 1.

When the activation signal is given again, e.g., system 200 is powered down and up or a cold reset is given, then row 1 would be slightly different. The second row would be the same, since variations are corrected. Row 3 and 4 would be the same if pseudorandom number generator 150 used a seed based on row 2, or a seed which is otherwise fixed. If pseudorandom number generator 150 is also used with a fixed seed to overwrite the first portion, then row 5 would also be the same.

In a different embodiment, memory 130 and enrollment-string reconstruction device 140 are not used. In that case, row 2 may be omitted. In row 5, the A's may then be overwritten with an inverse of row 1. In this situation, it is advantageous to introduce some noise in the numbers which are used to overwrite the R's. For example, yet a further random sequence of bits can be used, consisting of mostly 0 bits, and about 1 in 8 bits are 1. After the R's are overwritten with the fixed sequence, the yet further random sequence can be xor-ed with the first portion.

It is noted that an advantageous system is also obtained without memory-overwriting device 110 and pseudorandom number generator 150, using memory 120, memory 130, enrollment-string reconstruction device 140 and anti-degradation device 160. In that case, anti-degradation device 160 writes the inverse of the enrollment string to all of the plurality of memory locations. Optionally, such a system also uses temperature-sensor 170, in which case anti-degradation device 160 could write the inverse of the enrollment string to memory 120, if the temperature measurement of temperature-sensor 170 is above an upper threshold.

Note that an embodiment may omit writing inverses altogether. In that case, the memory locations indicated with an A map keep their original value. In an embodiment, no overwriting is done, in that case the 'R's may be replaced with 'A's.

FIG. 3 shows a flowchart, which illustrates one possible embodiment of the method according to the invention. The method generates an identifying response pattern from a memory used as a physically unclonable function, e.g. memory 120. The memory comprises a plurality of re-writable memory locations each memory location having at least two possible logical states. The method comprising applying an activation signal to an input of the memory 310, reading out the response pattern from the memory 320, obtaining a temperature measurement 330. In step 340, it is decided if the temperature measurement is below a predetermined lower temperature threshold. If so, then step 350 is executed, if not step 360. In step 350, at least a first portion of the plurality of memory locations is overwritten to obscure the response pattern in the memory. In step 360 to a second portion of the plurality of memory locations, an inverse of a logical state previously read from the respective location of the second portion is written.

In this particular embodiment of a method according to the invention, it is preferred that the memory is either completely overwritten or completely inverted, but this is not necessary and many variations are possible. In this embodiment, the method comprises overwriting the plurality of memory locations to obscure the response pattern in the memory conditionally upon the temperature measurement being below a predetermined lower temperature threshold, and writing to each respective location of the plurality of memory locations, an inverse of a logical state previously read from the respective location conditionally upon the temperature measurement not being below a predetermined lower temperature threshold Many different ways of executing the method are possible, as will be apparent to a person skilled in the art. For example, the order of the steps can be varied or some steps may be executed in parallel. Moreover, in between steps other method steps may be inserted either. The inserted steps may represents refinements of the method such as described herein, or may be unrelated to the method. For example, steps 310 and 320 may be executed, at least partially, in parallel with step 330. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

Figure 4:
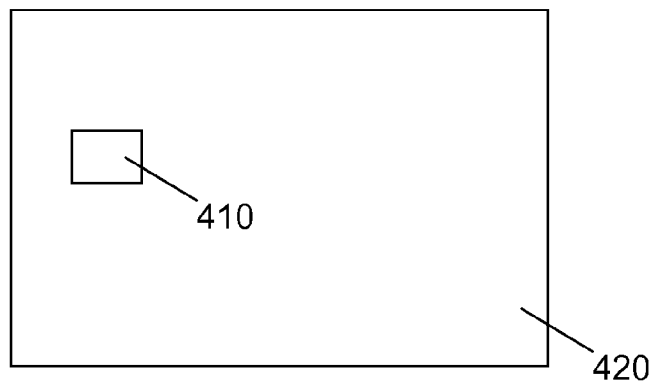
FIG. 4 shows a schematic top-view of a smart card.

FIG. 4 shows in top-view a schematic representation of a smart card 400 according to the invention. The smart card comprises an integrated circuit 410 and a, typically plastic, card 420 supporting integrated circuit 410. Circuit 410 comprises components for memories, e.g. memory 120 or 130. Circuit 410 comprises a processing unit for running computer program components to execute a method according to the invention. The processing unit may be connected to the memories via a bus. Circuit 410 may comprises other components such as a temperature sensor, a true random number generator, a cryptographic co-processor, etc. The card may be arranged for contact and/.or contact-less communication. The smart card may be used, e.g., in a set-top box to control access to content.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. In addition, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

TABLE 1

| 1 | e3 | 22 | 1a | b5 | ab | b4 | 59 | 5b | 4b | f7 | 5c | 93 | 02 | 5e | bd | 61 |
|---|----|----|----|----|----|----|----|----|----|----|----|----|----|----|----|----|
| 2 | f3 | 22 | 3a | b6 | ab | b4 | 59 | 4a | 5b | f7 | 5c | 93 | 02 | 5e | 2c | 89 |
| 3 | 22 | 69 | d4 | 6b | 69 | 3c | a9 | a6 | c8 | a7 | 92 | 5f | 1b | 76 | 25 | 81 |
| 4 | R | A | A | A | A | R | A | A | A | A | A | R | A | R | A |  |
| 5 | 8b | dd | c5 | 49 | 54 | 2b | a6 | b5 | a4 | 08 | a3 | 6c | 10 | a1 | 3e | 76 |

The invention claimed is:

1. A system for generating an identifying response pattern comprising
    a memory used as a physically unclonable function comprising a plurality of re-writable memory locations each memory location having at least two possible logical states, and an input for receiving an activation signal so as to cause each of said memory locations to enter one of its possible logical states, the entered state being dependent on physical, at least partially random characteristics of said memory, and thereby generating a response pattern of logical states useful for identifying the system, the generation of the response pattern is sensitive to degradation after repeated applications of the activation signal,
    a memory-overwriting device configured for overwriting at least a first portion of the plurality of memory locations to obscure the response pattern in the memory, and
    an anti-degradation device configured to write to each respective location of a second portion of the plurality of memory locations an inverse of a logical state previously read from the respective location of the second portion.

2. A system for generating an identifying response pattern as in claim 1 comprising a helper data memory, the helper data memory comprising error-correcting data for correcting deviations between the entered logical states and logical states previously read from the plurality of memory locations, wherein the memory-overwriting device is configured for overwriting the helper data memory.

3. A system for generating an identifying response pattern as in claim 1 comprising a tampering flag and wherein the memory-overwriting device is configured for overwriting conditionally upon the tampering flag being set.

4. A system for generating an identifying response pattern as in claim 1, wherein the memory-overwriting device is configured for overwriting the first portion of the plurality of memory locations with a sequence of random values.

5. A system for generating an identifying response pattern as in claim 1, comprising an exclusive-or device, wherein the memory-overwriting device is configured to obscure the response pattern in the memory by writing to the respective locations of the first portion of the plurality of memory locations an exclusive- or of the respective location's entered state and a respective value from a sequence of random values.

6. A system for generating an identifying response pattern as in claim 4 or 5, wherein the first portion of the plurality of memory locations and/or at least part of the sequence of random values is obtained by applying a pseudorandom function (150) to a fixed random-number seed.

7. A system for generating an identifying response pattern as in claim 6 wherein at least part of the sequence of random values is true random.

8. A system for generating an identifying response pattern as in claim 6, wherein the random-number seed is dependent upon the identifying response pattern.

9. A system for generating an identifying response pattern as in claim 1, comprising
    a helper data memory, the helper data memory comprising error-correcting data for correcting deviations between the entered logical states and logical states previously read from the plurality of memory locations, and
    an enrollment-string reconstruction device to reconstruct the logical states previously read from the plurality of memory locations configured to apply an error-correcting function to the error-correcting data and to the entered logical states to correct deviations between the entered logical states and the logical states previously read,
    wherein the anti-degradation device is configured to write to each respective location of the second portion of the plurality of memory locations an inverse of the reconstructed logical state previously read from the respective location of the second portion.

10. A system for generating an identifying response pattern as in claim 1, comprising a temperature-sensor, wherein
    the anti-degradation device is configured to write to the second portion conditionally upon a temperature measurement of the temperature-sensor being above a predetermined upper temperature threshold, or,
the memory-overwriting device is configured for overwriting at least a first portion of the plurality of memory locations conditionally upon a temperature measurement of the temperature-sensor being below a predetermined lower temperature threshold.

11. A system for generating an identifying response pattern as in claim 1, wherein the memory-overwriting device comprises a tuning parameter input for receiving a tuning parameter, the memory-overwriting device being configured to set the proportion between the number of locations in the first portion and the number of locations in the second portion in dependency upon the tuning parameter.

12. A system for generating an identifying response pattern as in claim 11, wherein the tuning parameter is temperature dependent.

13. A method of generating an identifying response pattern from a memory used as a physically unclonable function, the memory comprising a plurality of re-writable memory locations each memory location having at least two possible logical states, wherein the generation of the response pattern is sensitive to degradation after repeated applications of the activation signal,
the method comprising
applying an activation signal to an input of the memory so as to cause each of said memory locations to enter one of its possible logical states, the entered state being dependent on physical, at least partially random characteristics of said memory, and thereby generating the response pattern of logical states useful for identifying the memory,
reading out the response pattern from the memory,
wherein the method further comprises
overwriting at least a first portion of the plurality of memory locations to obscure the response pattern in the memory,
writing to each respective location of a second portion of the plurality of memory locations an inverse of a logical state previously read from the respective location of the second portion.

14. A method of generating a response as in claim 13, comprising obtaining a temperature measurement, and wherein
the writing to each respective location of a second portion of the plurality of memory locations is done conditionally upon the temperature measurement being above a predetermined temperature threshold, or
the overwriting of at least a first portion of the plurality of memory locations is done conditionally upon the temperature measurement being below a predetermined lower temperature threshold.

15. A computer program comprising computer program code means adapted to perform all the steps of claim 13 when the computer program is run on a computer.

16. A computer program as claimed in claim 15 embodied on a computer readable medium.

* * * * *